United States Patent
Uchikawa

(10) Patent No.: US 10,061,931 B2
(45) Date of Patent: Aug. 28, 2018

(54) IMAGE PROCESSING APPARATUS, CONTROL METHOD THEREFOR, AND COMPUTER-READABLE STORAGE MEDIUM STORING PROGRAM FOR IMPLEMENTING THE METHOD

(75) Inventor: Hiroshi Uchikawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 579 days.

(21) Appl. No.: 13/526,190

(22) Filed: Jun. 18, 2012

(65) Prior Publication Data

US 2012/0260333 A1 Oct. 11, 2012

Related U.S. Application Data

(62) Division of application No. 12/611,450, filed on Nov. 3, 2009, now abandoned.

(30) Foreign Application Priority Data

Nov. 4, 2008 (JP) .................................. 2008-283306

(51) Int. Cl.
*G06F 21/60* (2013.01)
*G06F 21/31* (2013.01)
(Continued)

(52) U.S. Cl.
CPC ............ *G06F 21/608* (2013.01); *G06F 21/31* (2013.01); *G06F 21/84* (2013.01); *H04N 1/00244* (2013.01); *H04N 1/4413* (2013.01); *H04N 1/4433* (2013.01); *G06F 2221/2149* (2013.01); *H04N 1/00204* (2013.01); *H04N 1/4426* (2013.01); *H04N 2201/0039* (2013.01); *H04N 2201/0094* (2013.01)

(58) Field of Classification Search
CPC ......... G06F 21/84; G06F 21/31; G06F 21/608
USPC ........................................ 726/17, 7; 380/55
See application file for complete search history.

(56) References Cited

U.S. PATENT DOCUMENTS 7,343,114 B2 3/2008 Uruta
7,437,457 B1 10/2008 Eisendrath et al.
(Continued)

FOREIGN PATENT DOCUMENTS

JP 11-025040 A 1/1999
JP 11-031019 A 2/1999
(Continued)

OTHER PUBLICATIONS

T. Y. C. Woo and S. S. Lam, "Authentication for distributed systems," in Computer, vol. 25, No. 1, pp. 39-52, Jan. 1992.*
(Continued)

*Primary Examiner* — Kari L Schmidt
(74) *Attorney, Agent, or Firm* — Rossi, Kimms & McDowell LLP

(57) ABSTRACT

An image processing apparatus capable of reducing the frequency of a user's inputting work for authentication information to improve the convenience. When the number of the logged-in users is one, the logged-in user is set as an executor of the predetermined function, and when the number of the logged-in users is two or more, the user is caused to select one of the logged-in users to set the selected one as the executor of the predetermined function.

18 Claims, 18 Drawing Sheets

(51) Int. Cl.
*G06F 21/84* (2013.01)
*H04N 1/00* (2006.01)
*H04N 1/44* (2006.01)

(56) References Cited

U.S. PATENT DOCUMENTS

| | | | |
|---|---|---|---|
| 7,529,931 B2* | 5/2009 | Vasishth et al. | 713/166 |
| 7,983,402 B2 | 7/2011 | Ohara et al. | |
| 8,024,813 B2* | 9/2011 | Hong et al. | 726/28 |
| 8,243,300 B2* | 8/2012 | Oomura | G06F 21/608 |
| | | | 358/1.14 |
| 8,510,858 B2* | 8/2013 | Lee | H04L 63/083 |
| | | | 726/27 |
| 2004/0153675 A1* | 8/2004 | Dorn | G06F 21/6218 |
| | | | 726/5 |
| 2004/0260617 A1* | 12/2004 | Davidson et al. | 705/26 |
| 2005/0265744 A1 | 12/2005 | Uruta | |
| 2005/0268104 A1* | 12/2005 | Sugishita et al. | 713/176 |
| 2006/0259964 A1* | 11/2006 | Maldonado | G06F 21/604 |
| | | | 726/16 |
| 2006/0277287 A1* | 12/2006 | McCall | G06Q 10/06 |
| | | | 709/223 |
| 2007/0061573 A1 | 3/2007 | Dokuni et al. | |
| 2007/0282995 A1* | 12/2007 | Mizuno | G06F 3/1204 |
| | | | 709/223 |
| 2008/0080887 A1* | 4/2008 | Suzuki | 399/81 |
| 2008/0100610 A1 | 5/2008 | Murakami et al. | |
| 2008/0201771 A1 | 8/2008 | Ueda | |
| 2008/0289031 A1 | 11/2008 | Anno | |
| 2009/0024531 A1* | 1/2009 | Yamahata et al. | 705/55 |
| 2009/0077659 A1* | 3/2009 | Segawa | 726/21 |
| 2009/0141951 A1* | 6/2009 | Ogo | H04N 1/0035 |
| | | | 382/124 |
| 2010/0064256 A1* | 3/2010 | Esaki | H04N 1/00413 |
| | | | 715/825 |
| 2015/0324564 A1* | 11/2015 | Sahu | G06F 21/45 |
| | | | 726/19 |

FOREIGN PATENT DOCUMENTS

| | | |
|---|---|---|
| JP | 2006-041717 A | 2/2006 |
| JP | 2006-235728 A | 9/2006 |
| JP | 2007042015 A | 2/2007 |
| JP | 2007-058589 A | 3/2007 |
| JP | 2007079684 A | 3/2007 |
| JP | 2007-094673 A | 4/2007 |
| JP | 2007-122366 A | 5/2007 |
| JP | 2007295245 A | 11/2007 |
| JP | 2008-109416 A | 5/2008 |
| JP | 2008-262338 A | 10/2008 |
| WO | 2008/123247 A1 | 10/2008 |

OTHER PUBLICATIONS

Grasso, Antonietta, and Jean-Luc Meunier. "Who can claim complete abstinence from peeking at print jobs?." Proceedings of the 2002 ACM conference on Computer supported cooperative work. ACM, 2002. pp. 296-305.*

Office Action issued in Japanese Patent Application No. 2013-024395 dated Oct. 7, 2014.

Japanese Office Action cited in Japanese counterpart application No. JP2013-024395, dated Feb. 10, 2014.

JP Office Action dated Dec. 11, 2012 for corresponding JP 2008-283306.

Office Action issued in Japanese Appln. No. 2015-173049 dated Oct. 11, 2016.

* cited by examiner

FIG.6

SELECT FUNCTION TO BE USED

- COLOR COPYING ~9001
- FAX ~9004
- E-MAIL
- NETWORK MANAGEMENT ~9003

RETURN TO MENU ~9002

◀ CURRENTLY BEING EXECUTED BY USER A ~9005

| | | USER A | USER B | ANONYMOUS USER |
|---|---|---|---|---|
| USER PROFILE | | | | |
| | USER TYPE | REAL-NAME USER | REAL-NAME USER | ANONYMOUS USER |
| | USERNAME | user_a | user_b | |
| | MAIL ADDRESS | user_a@mail.com | user_b@mail.com | |
| USER AUTHORITY | | | | |
| | COLOR COPYING | PERMITTED | PROHIBITED | PERMITTED |
| | NETWORK MANAGEMENT | PROHIBITED | PERMITTED | PROHIBITED |
| | FAX | PROHIBITED | PROHIBITED | PROHIBITED |

|  |  | USER A | USER B |
|---|---|---|---|
| USER PROFILE |  |  |  |
|  | USERNAME | user_a | user_b |
|  | MAIL ADDRESS | user_a@mail.com | user_b@mail.com |
| USER AUTHORITY |  |  |  |
|  | COLOR COPYING | PERMITTED | PROHIBITED |
|  | NETWORK MANAGEMENT | PROHIBITED | PERMITTED |
|  | FAX | PROHIBITED | PERMITTED |

IMAGE PROCESSING APPARATUS, CONTROL METHOD THEREFOR, AND COMPUTER-READABLE STORAGE MEDIUM STORING PROGRAM FOR IMPLEMENTING THE METHOD

This application is a division of U.S. patent application Ser. No. 12/611,450 filed Nov. 3, 2009, which claims the benefit of priority to JP Patent Application No. 2008-283306, filed Nov. 4, 2008; the contents of each are incorporated herein by reference in their entirety.

BACKGROUND OF THE INVENTION

Field of the Invention

The present invention relates to an image processing apparatus, such as a multifunction peripheral, a control method therefor, and a computer-readable storage medium storing a program for implementing the method.

Description of the Related Art

Recently, among image processing apparatuses including a multifunction peripheral, there exist a lot of apparatuses configured to be able to restrict access to jobs and resources depending on a user who has logged in by a user authentication. In such image processing apparatuses, when a user tries to perform an operation while he has logged in, and the user does not have the authority to execute the operation, it is common that an authentication screen is displayed to prompt the user to log in as a different user having the authority.

There exists a configuration for the user session management, such that when the user logs in as a different user, all the information related to the user (for example, a user profile including a user name, a user's mail address and the like, and user authority) is completely switched (hereinafter this configuration will be referred to as Prior Art 1). In this case, immediately before the user logs in as the different user, the user who has logged in is automatically caused to log out (for example, see Japanese Laid-Open Patent Publication (Kokai) No. H11-25040).

There exists another configuration for the user session management only re-evaluating the user authority of the user information about the user who has already logged in while maintaining the user profile of the user information such as the user name, the user's mail address (hereinafter this configuration will be referred to as Prior Art 2). As a re-evaluation method in this case, it is common that the user authority held by the user who has logged in later is added to the user authority held by the user who has logged in earlier.

FIG. 16 is a timing chart showing the user session management of Prior Art 1.

Reference numeral 4001 in FIG. 16 indicates a user profile including a user name, a user's mail address and the like to be actually applied in a user session. Reference numeral 4002 indicates the user authority of a user who has currently logged in. Reference numeral 4003 indicates login user information which an image forming apparatus stores in association with a user session to determine the contents of the user profile 4001 and the user authority 4002. FIG. 17 is a tabular form diagram showing settings for the user profiles and user authorities of users A and B to be used in FIG. 16.

According to Prior Art 1, when a user inputs user information on a login screen at time t401, a process of logging in as the user A is executed. Since the user A is permitted to execute color copying in the setting information in FIG. 17, he can execute color copying.

Next, when the user attempts to execute a network management function at time t402, authentication as a user who is permitted to execute the network management function is requested because the user A is prohibited to execute the network management function. Here, when the user inputs the authentication information about the user B who is an administrator and is permitted to execute the network management function, and a process of logging in as the user B is performed, the user profile 4001 is changed to that of the user B as indicated by reference numeral 4021 in FIG. 16, and the user authority 4002 is change to that of the user B as indicated by reference numeral 4022 in FIG. 16. Then, it becomes possible for the user to execute the network management function.

Next, when the user attempts to execute color copying again at time t403, authentication as a user who is permitted to execute the function is requested because the user B is prohibited to execute color copying. In this case, if the user inputs again the authentication information about the user A who is permitted to execute color copying, he can execute color copying.

Thus, Prior Art 1 adopts the configuration in which, when a new user logs in, a user who has already logged in is caused to log out. In this configuration, since all the information related to the user is switched, there may be a case where a function which can be used as a certain user cannot be used after a process of logging in as a different user is performed. In order to enable the disabled function again, the user has to log in again. As a result, there is a problem that the user is requested to log in again and again, thereby degrading the usability.

FIG. 18 is a timing chart showing the user session management of Prior Art 2.

Reference numerals 6001 to 6003 in FIG. 18 indicate the same as indicated by reference numerals 4001 to 4003 in FIG. 16. It is assumed that the settings for the user profiles and user authorities of users A and B in the example of FIG. 18 are similar to those in the example of FIG. 17.

When a user inputs user information on a login screen at time t601, a process of logging in as the user A is performed. Since the user A is permitted to execute color copying in the setting information of FIG. 17, he can execute color copying.

When the user attempts to execute a network management function at the next time t602, authentication as a user who is permitted to execute the network management function is requested because the user A is prohibited to execute the network management function. Here, when the user inputs the authentication information about the user B who is an administrator and is permitted to execute the network management function, and a process of logging in as the user B is performed, the user profile 6001 continues to be that of the user A as indicated by reference numeral 6021 in FIG. 18. However, as for the user authority 6002, all of the items, each of which has been permitted to any of the users A and B, are changed to be "permitted" as indicated by reference numeral 6022 in FIG. 8.

When the user attempts to execute color copying again at the next time t603, he can execute color copying without the need for displaying the authentication screen again because the user A is permitted to execute color copying even after the user authority is changed.

Thus, in Prior Art 2, the user authority is re-evaluated so that, if an item is permitted to any of a user who has logged in earlier or a user who logs in later, the item is permitted. Therefore, it does not happen that a function which can be used as a certain user cannot be used after a process of logging in as a different user is performed, thereby improving the usability in comparison with Prior Art 1.

However, it is difficult for a user to intuitively determine whether or not the user profile including a user name, a user's mail address and the like is still the user profile of a user who has logged in earlier or is switched to the user profile of a user who has logged in later.

For example, it is assumed that there exists an image processing apparatus which is provided with an e-mail transmission function and which automatically sets a login user's mail address as the sender address of an outgoing mail. Suppose that, while a user has logged in this image processing apparatus as a user A, it becomes necessary to change a certain management setting item, and the user logs in again as a user B, who is an administrator, changes the management setting item, and thereafter transmits an e-mail. In this case, it is difficult to determine which of the users A and B is automatically set as the sender address. Furthermore, as a result of logging in again to change settings, there may be caused problems, such as being charged as an unintended user's print job, being set an unintended name as a fax sender name, and being referred unintended user data as a user's fixed work and personal data such as an address book.

SUMMARY OF THE INVENTION

In view of the above conventional problems, the present invention provides an image processing apparatus capable of reducing the frequency of a user's inputting work for authentication information to improve the convenience, in a system which restricts access to jobs and resources depending on a user who has logged in, a control method therefor, and a computer-readable storage medium storing a program for implementing the method.

It is also intended to enable a user to easily determine which user's user profile, among those of logged-in users, an operation for executing a function is performed on the basis of.

In a first aspect of the present invention, there is provided an image processing apparatus enabling a user who has logged in to multiply log in as a different user to execute a predetermined function, the image processing apparatus comprising a user authentication unit adapted to perform authentication of a user, an access restriction unit adapted to restrict access to a predetermined function depending on the user the authentication of which is performed by the user authentication unit, a management unit adapted to manage user information about the user who has multiply logged in, for each login independently, a confirmation unit adapted to confirm the number of logged-in users by referring to the user information managed by the management unit when the predetermined function is to be executed, a first setting unit adapted to, when the number of the logged-in users is one as a result of the confirmation by the confirmation unit, set the logged-in user as an executor of the predetermined function, and a second setting unit adapted to, when the number of the logged-in users is two or more as a result of the confirmation by the confirmation unit, cause the user to select one of the logged-in users to set the selected one as the executor of the predetermined function.

In a second aspect of the present invention, there is provided a control method enabling a user who has logged in to multiply log in as a different user to execute a predetermined function, the image processing apparatus comprising a user authentication unit adapted to perform authentication of a user, an access restriction unit adapted to restrict access to a predetermined function depending on the user the authentication of which is performed by the user authentication unit, a management unit adapted to manage at least user type information about user classification, username information about a username, and user authority information about the access restriction as user information about the user who has multiply logged in, for each login, and a determination unit adapted to determine whether or not to permit the logged-in user to log in as the different user according to the user type information about the logged-in user.

In a third aspect of the present invention, there is provided a control method for an image processing apparatus enabling a user who has logged in to multiply log in as a different user to execute a predetermined function, the method comprising a user authentication step of authenticating a user, an access restriction step of restricting access to a predetermined function depending on the user the authentication of which is performed in the user authentication step, a management step of managing user information about the user who has multiply logged in, for each login independently, a confirmation step of confirming the number of logged-in users by referring to the user information managed in the management step when the predetermined function is to be executed, a first setting step of, when the number of the logged-in users is one as a result of the confirmation in the confirmation step, setting the logged-in user as an executor of the predetermined function, and a second setting step of, when the number of the logged-in users is two or more as a result of the confirmation in the confirmation step, causing the user to select one of the logged-in users to set the selected one as the executor of the predetermined function.

In a fourth aspect of the present invention, there is provided a control method for an image processing apparatus enabling a user who has logged in to multiply log in as a different user to execute a predetermined function, the method comprising a user authentication step of authenticating a user, an access restriction step of restricting access to a predetermined function depending on the user the authentication of which is performed in the user authentication step, a management step of managing at least user type information about user classification, username information about a username, and user authority information about the access restriction as user information about the user who has multiply logged in, for each login, and a determination step of determining whether or not to permit the logged-in user to log in as the different user according to the user type information about the logged-in user.

In a fifth aspect of the present invention, there is provided a computer-readable storage medium storing a computer-readable program for implementing a control method for an image processing apparatus enabling a user who has logged in to multiply log in as a different user to execute a predetermined function, wherein the method comprises a user authentication step of authenticating a user, an access restriction step of restricting access to a predetermined function depending on the user the authentication of which is performed in the user authentication step, a management step of managing user information about the user who has multiply logged in, for each login independently, a confirmation step of confirming the number of logged-in users by referring to the user information managed in the management step when the predetermined function is to be executed, a first setting step of, when the number of the logged-in users is one as a result of the confirmation in the confirmation step, setting the logged-in user as an executor of the predetermined function, and a second setting step of, when the number of the logged-in users is two or more as a result of the confirmation in the confirmation step, causing the user to select one of the logged-in users to set the selected one as the executor of the predetermined function.

In a sixth aspect of the present invention, there is provided a computer-readable storage medium storing a computer-readable program for implementing a control method for an image processing apparatus enabling a user who has logged in to multiply log in as a different user to execute a predetermined function, wherein the method comprises a user authentication step of authenticating a user, an access restriction step of restricting access to a predetermined function depending on the user the authentication of which is performed in the user authentication step, a management step of managing at least user type information about user classification, username information about a username, and user authority information about the access restriction as user information about the user who has multiply logged in, for each login, and a determination step of determining whether or not to permit the logged-in user to log in as the different user according to the user type information about the logged-in user.

According to the present invention, it is possible to reduce the frequency of a user's inputting work for authentication information, thus improving the convenience. Furthermore, a user can easily determine which user's user profile, among those of multiply logged-in users, a predetermined function is executed on the basis of.

The above and other objects, features, and advantages of the invention will become more apparent from the following detailed description taken in conjunction with the accompanying drawings.

BRIEF DESCRIPTION OF THE DRAWINGS

FIG. 6 is a diagram showing a menu screen used in the first embodiment.

FIG. 11 is a tabular form diagram showing settings for user profiles and user authorities used in FIG. 10.

FIG. 17 is a tabular form diagram showing settings for user profiles and user authorities used in FIG. 16.

DETAILED DESCRIPTION OF THE PREFERRED EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

First Embodiment

System Configuration

Figure 1:
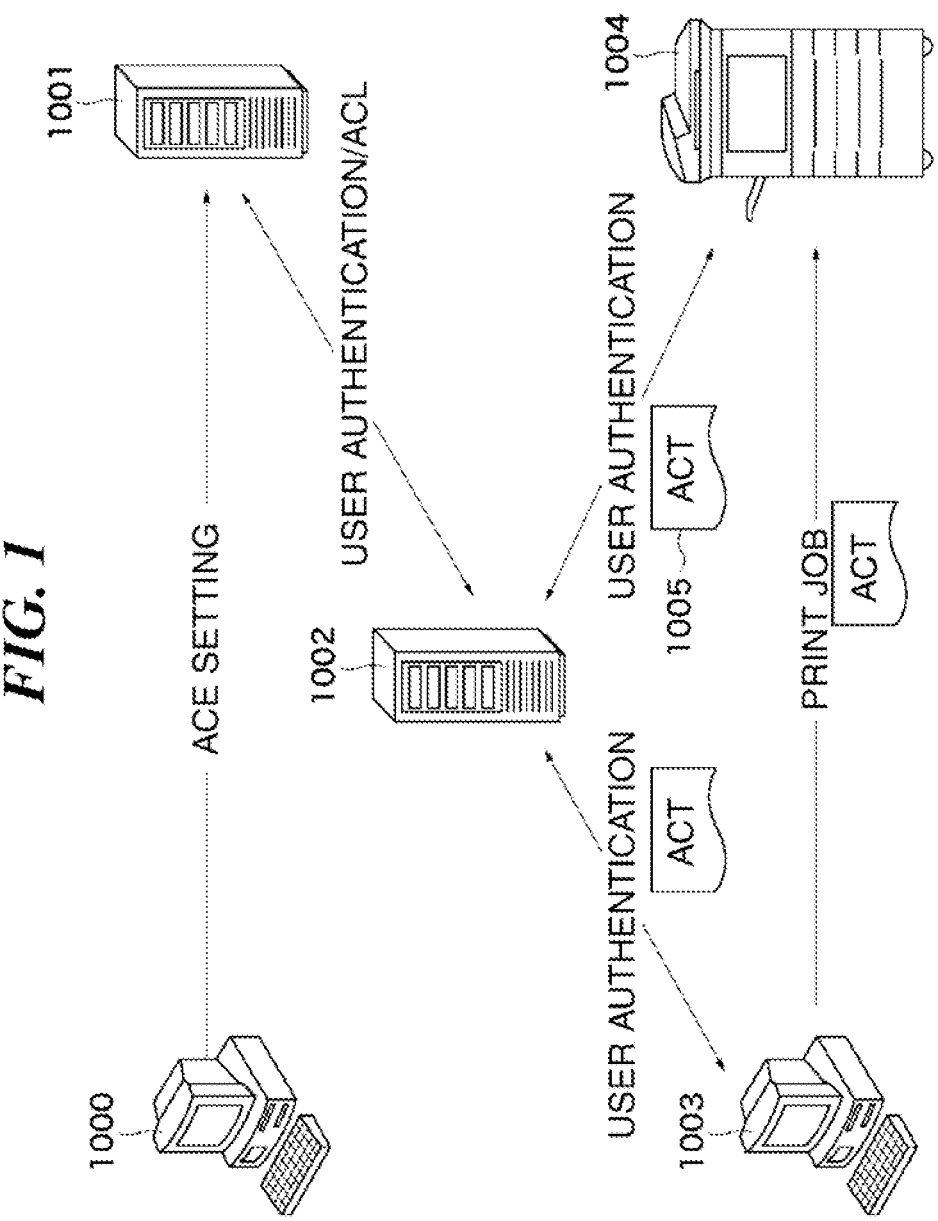
FIG. 1 is a schematic diagram showing the configuration of a system including an image processing apparatus according to the present invention.

FIG. 1 is a schematic diagram showing the configuration of a system including an image processing apparatus according to the present invention.

This system is configured by a server PC (personal computer) 1000, a user information server apparatus 1001, a ticket issuing server apparatus 1002, a client PC 1003, and an image processing apparatus 1004 which are connected with each other on a network. This system is a print management system which performs restriction of access by users who use the devices and restriction of execution of jobs, such as restriction of the number of prints. It should be noted that the users here include individual users, divisions, organizations and the like.

In the server PC 1000, a system administrator utility operates so that the server PC 1000 can perform setting and management of this system. Especially, the server PC 1000 can set function restriction information, more specifically access control entry (hereinafter referred to as ACE), to the user information server apparatus 1001. The user information server apparatus 1001 hold user information such as user IDs and passwords, and further hold function restriction information lists, more specifically access control lists (hereinafter referred to as ACL), which are a set of ACEs, indicating which functions are permitted to each of the users and the devices in the system.

The ticket issuing server apparatus 1002 issues a ticket on which information about available functions are described, on the basis of the ACL stored in the user information server apparatus 1001.

The client PC 1003 is in an available state in this system after login is performed. Specifically, after the login is performed, it is possible to use a printer driver for the image processing apparatus 1004 on the client PC 1003, and it is known on the server PC 1000 which user is using the client PC.

The image processing apparatus 1004 is, for example, a multifunctional copying machine. The image processing apparatus 1004 has not only a function of copying an original paper document but also a function of printing print data sent from an external printer driver and a function of reading an original paper document and transmitting its image data to an external file server or a mail address (a send function). Furthermore, the image processing apparatus 1004 also has a function of transmitting data to another image processing apparatus so as to print the data on the another image processing apparatus to be transmitted (a remote copy function and a facsimile function) and the like.

The three "ACT" symbols in FIG. 1 indicate an abbreviation of Access Control Token. For example, an ACT 1005 is data containing information on functions which a user can execute on the image processing apparatus 1004 and function restriction information about the image processing apparatus 1004, thus the ACT 1005 can play a role of transferring the information from a server to a device.

It is assumed that the server PC 1000, the user information server apparatus 1001, the ticket issuing server apparatus 1002, and the client PC 1003 described above are connected with each other via Ethernet (registered trademark). However, it is only an example of the system. All the connected devices of the server PC 1000, the user information server apparatus 1001, the ticket issuing server apparatus 1002, and the client PC 1003, except the image processing apparatus 1004, may be integrated into the same computer. Furthermore, the server PC 1000, the user information server apparatus 1001, the ticket issuing server apparatus 1002, and the client PC 1003 may be implemented into the image processing apparatus 1004 so that the system is configured only by the image processing apparatus 1004.

Hardware Configuration of Image Processing Apparatus

Figure 2:
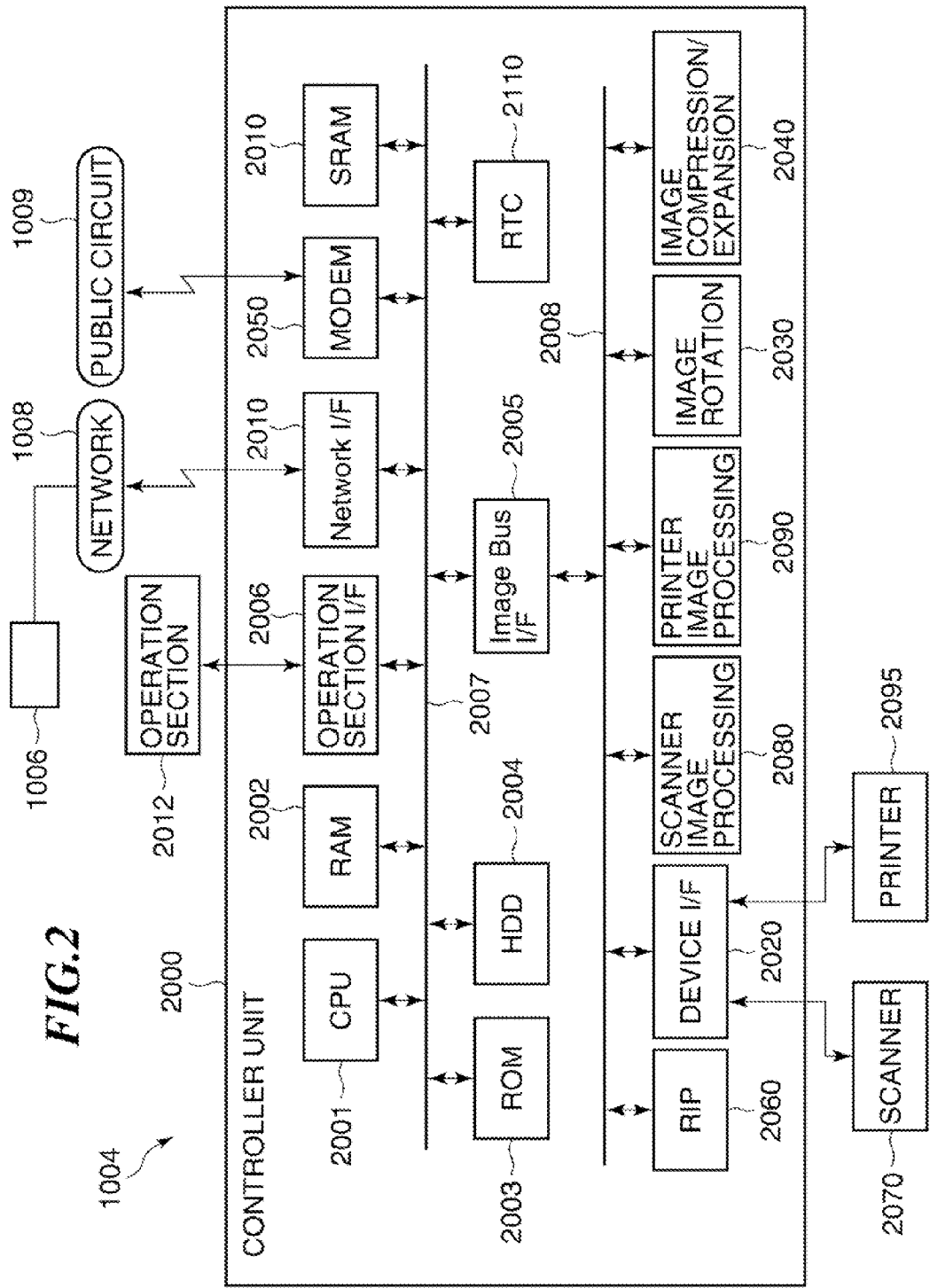
FIG. 2 is a block diagram showing the hardware configuration of the image processing apparatus.

FIG. 2 is a block diagram showing the hardware configuration of the image processing apparatus 1004.

A controller unit 2000 performs input/output of image information or device information by being connected to a scanner 2070, which is an image input device, or a printer 2095, which is a image output device, while being connected to a network 1008 or a public circuit 1009. A CPU 2001 is a controller which controls the whole image processing apparatus 1004. A RAM 2002 is a system work memory used for the CPU 2001 to operate. The RAM 2002 is also an image memory for temporarily storing image data. A ROM 2003 is a boot ROM, in which the boot program of the system is stored. An HDD 2004 is a hard disk drive, in which system software, applications, and image data are stored.

An operation section I/F 2006 is an interface section interfacing with an operation section 2012 provided with a touch panel, and the operation section I/F 2006 outputs image data to be displayed on the operation section 2012, to the operation section 2012. Furthermore, the operation section I/F 2006 has a role of communicating information inputted from the operation section 2012 by the user of this system, to the CPU 2001. A network I/F 2010 is connected to the network 1008 to input/output information. A modem 2050 is connected to the public circuit 1009 to input/output information.

An SRAM 2100 is a non-volatile storage medium capable of operating at a high speed. An RTC 2110 is a real-time clock, and it performs processing for continuing counting time even when the controller unit 200 is not powered on. The devices described above are arranged on a system bus 2007.

An image bus I/F 2005 is a bus bridge which connects the system bus 2007 and an image bus 2008, which transfers image data at a high speed, to convert a data structure of the image data. The image bus 2008 is configured by a PCI bus or an IEEE1394 bus. The devices described below are arranged on the image bus 2008.

An RIP 2060 is a raster image processor which develops a PDL code into a bitmap image. A device I/F section 2020 connects the scanner 2070 and the printer 2095, which are image input and output devices, and the controller unit 2000 to synchronous/asynchronous conversion of image data. A scanner image processing section 2080 performs correction, processing, and editing of inputted image data. A printer image processing section 2090 performs correction, resolution conversion, and the like of a printer for print output image data. An image rotation section 2030 rotates image data. An image compression/expansion section 2040 performs compression/expansion processing.

Software Configuration of Image Processing Apparatus

Figure 3:
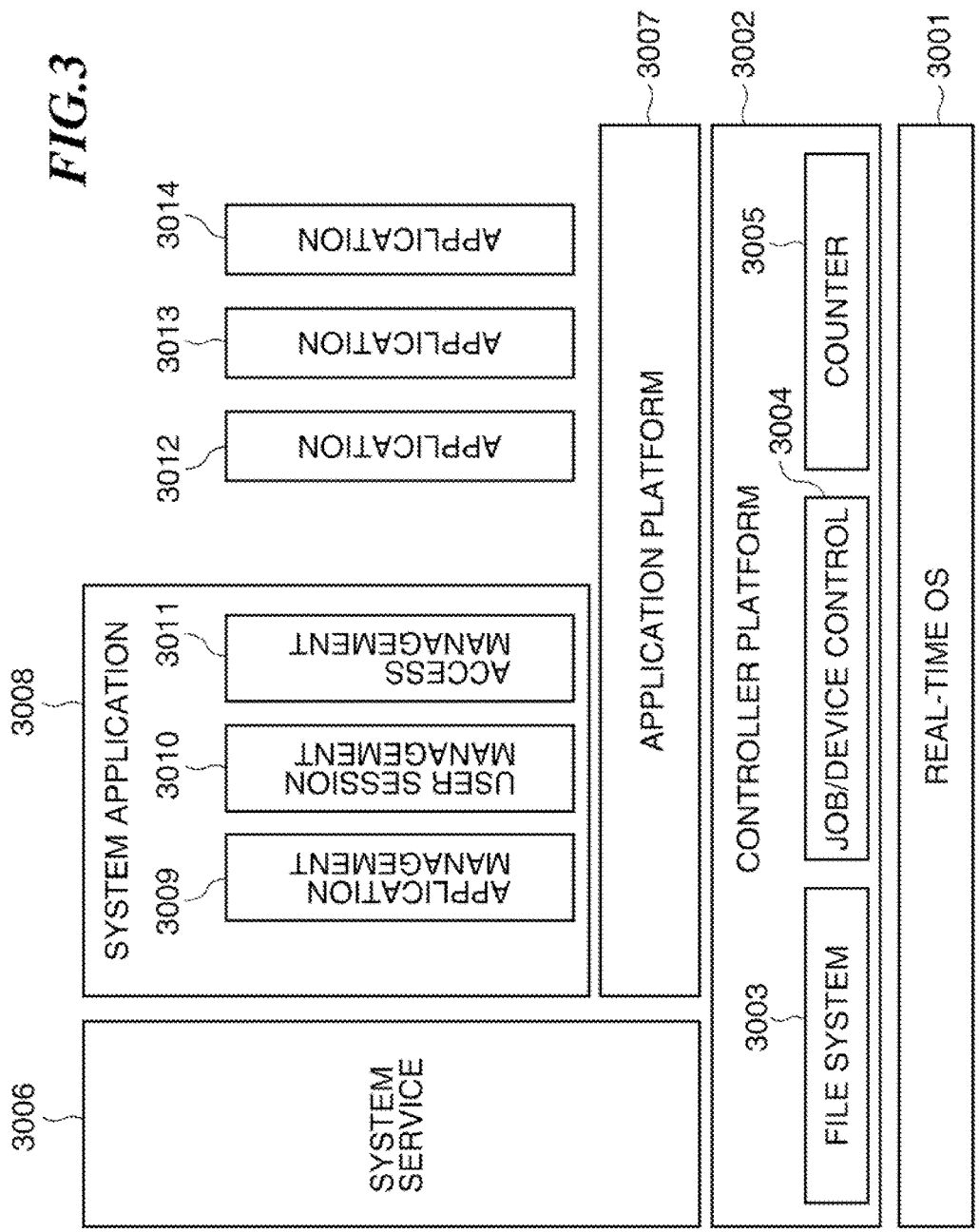
FIG. 3 is a block diagram showing the software configuration of the image processing apparatus.

FIG. 3 is a block diagram showing the software configuration of the image processing apparatus 1004.

The software is implemented into the controller unit 2000 included in the image processing apparatus 1004. The software included in the image processing apparatus 1004 and processed by the controller unit 2000 is implemented as so-called firmware, and it is executed by the CPU 2001.

A real-time OS 3001 is a real-time operating system, and it provides various resource management services and their frameworks optimized for control of an embedded system, to software operating thereon.

A controller platform 3002 is configured by a file system 3003, a job/device control 3004, a counter 3005, and the like. The file system 3003 is a mechanism for storing data which is constructed on a storage device, such as the HDD 2004 and the RAM 2002. The job/device control 3004 controls the hardware of the image processing apparatus 1004, and it also controls jobs which use basic functions (printing, scanning, communication, image conversion, and the like) provided mainly by the hardware of the image processing apparatus 1004. The counter 3005 manages the expiration date for each application and counter values of printing and scanning, which are stored in the SRAM 2100.

A system service 3006 is a module for monitoring the operation state of the image processing apparatus 1004 or downloading software or license from a software distribution server 1006 (see FIG. 2) via the network 1008.

An application platform 3007 is middleware for causing the mechanisms of the real-time OS 3001 and the controller platform 3002 to be available from a system application 3008 or applications 3012, 3013 and 3014 which can be added. The system application 3008 is configured by application management 3009, user session management 3010, and access management 3011.

The application management 3009 is a management module for causing the applications 3012, 3013 and 3014 to be installed, uninstalled, activated, and stopped. The user session management 3010 is a module for managing user information about a user who has been multiply logged in, for each login independently. That is, it is a module for managing user profiles and user authorities in response to login/logout by the user. The access management 3011 is a security module for permitting or prohibiting access to various jobs and resources on the basis of the user authorities in the user session management 3010.

The application 3012 is application software which realizes various business models using functions provided by the application platform 3007.

User Session Management of First Embodiment

Next, the user session management of the first embodiment will be described with reference to FIG. 4.

Figure 4:
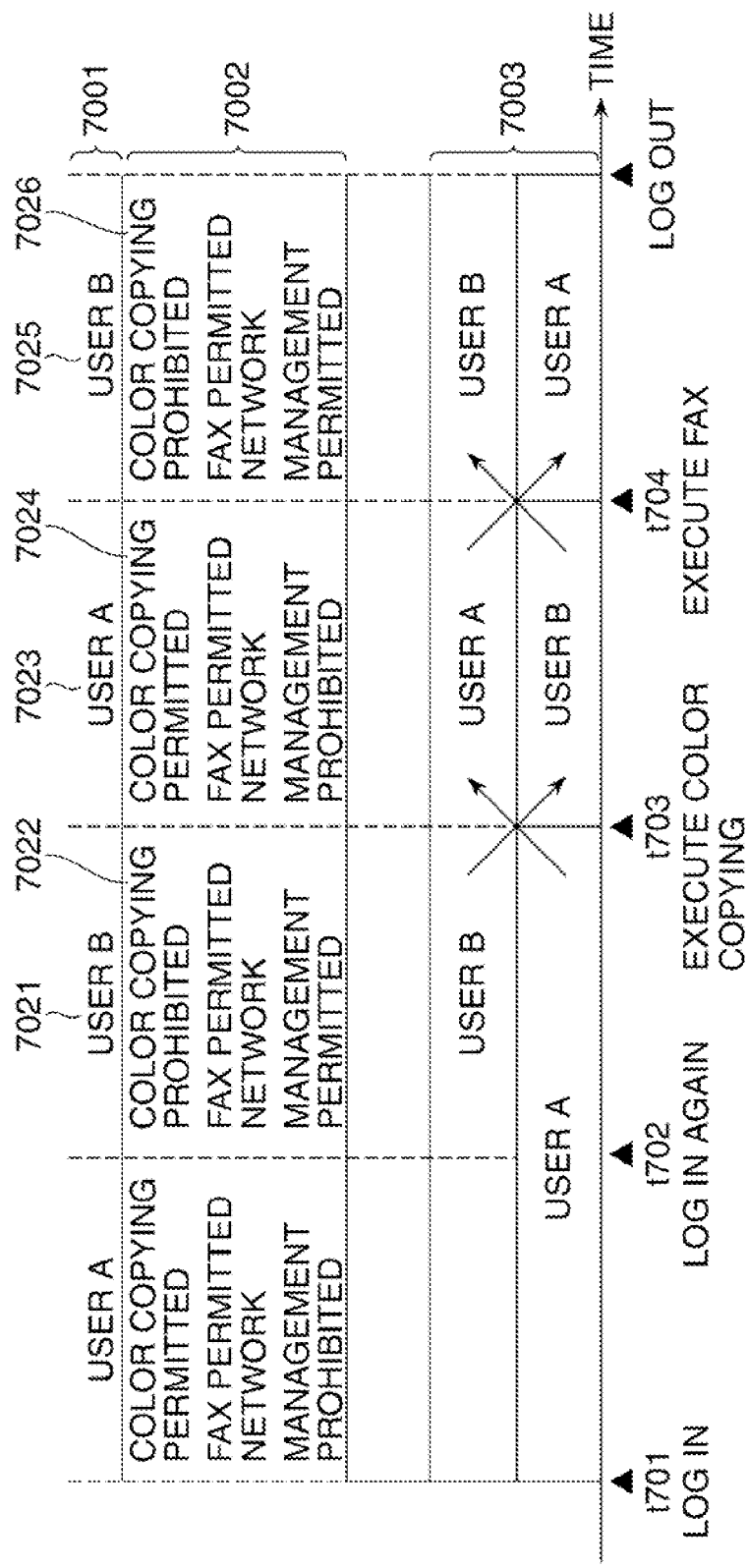
FIG. 4 is a timing chart showing user session management according to a first embodiment of the present invention.

FIG. 4 is a timing chart showing the user session management according to the first embodiment of the present invention.

Figure 16:
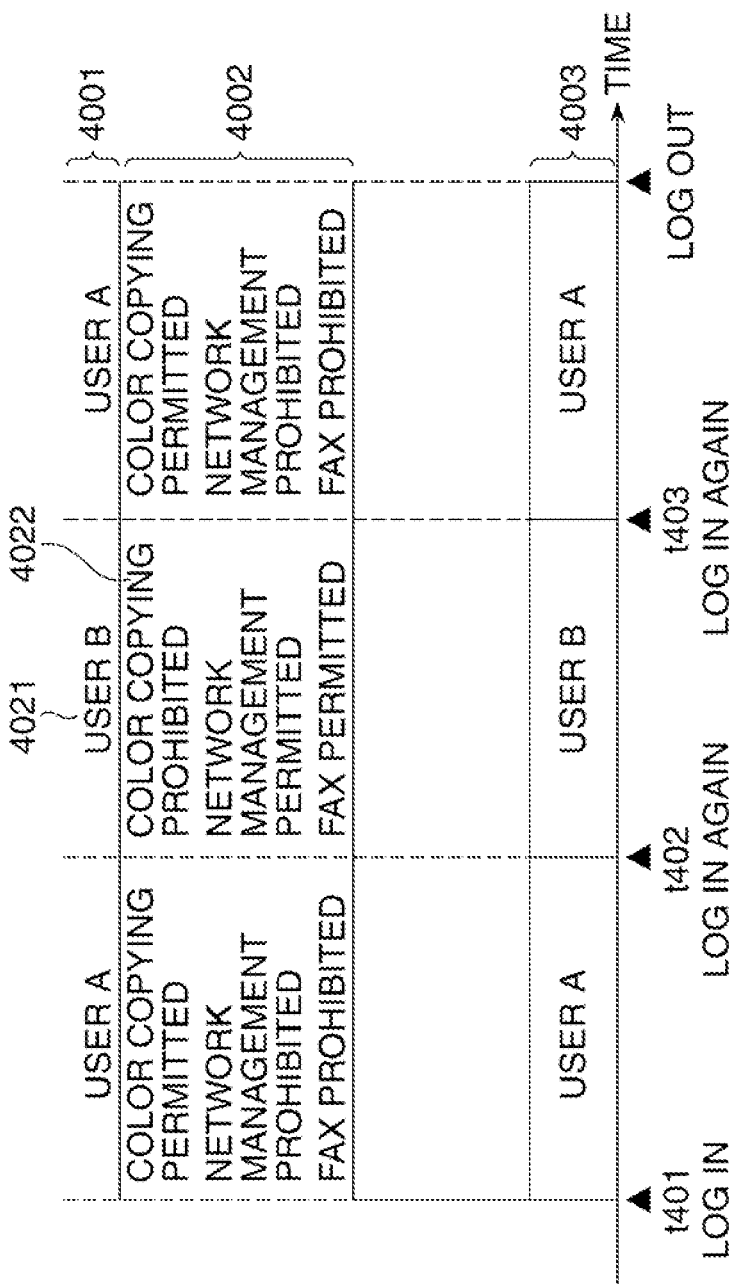
FIG. 16 is a timing chart showing the user session management of Prior Art 1.
Figure 18:
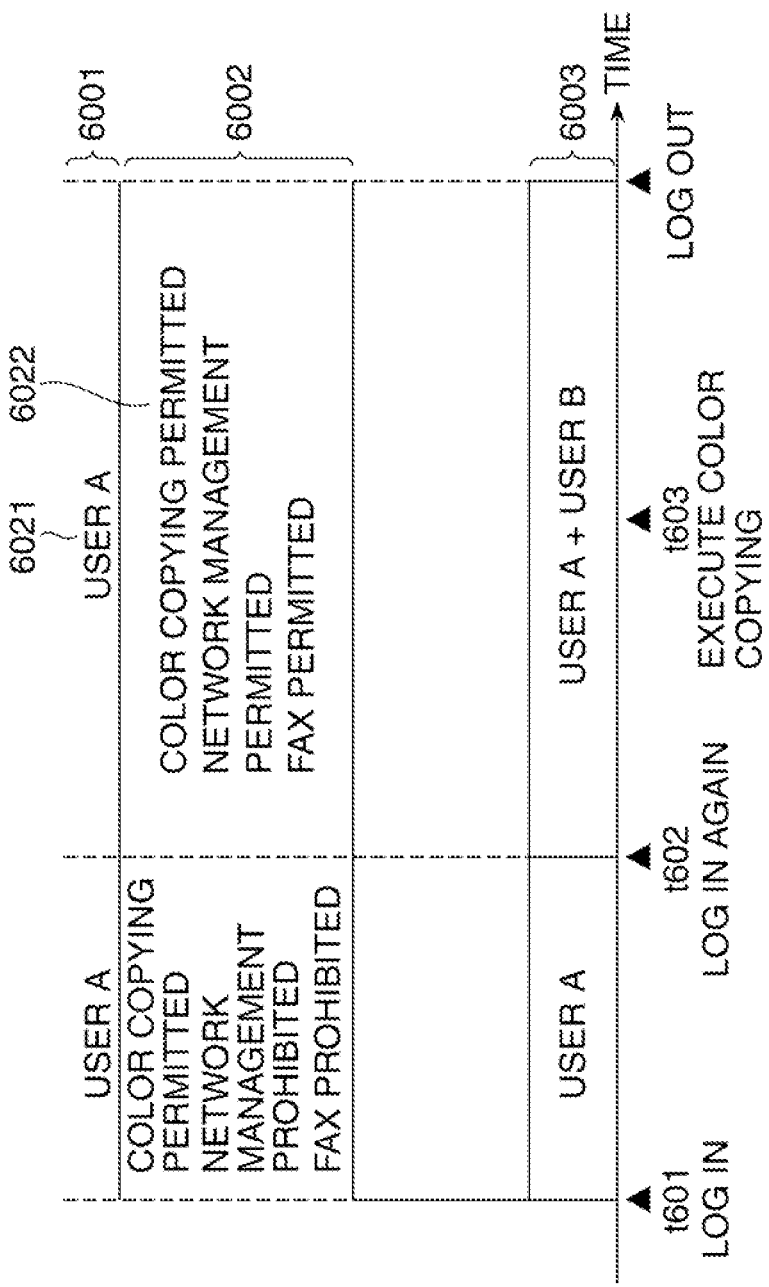
FIG. 18 is a timing chart showing the user session management of Prior Art 2.

The user session management of this embodiment is executed by the CPU 2001 of the image processing apparatus 1004 as the function of the user session management 3010 and the access management 3011. Reference numerals 7001 to 7003 in FIG. 4 indicate the same as indicated by reference numerals 4001 to 4003 in FIG. 16. It is assumed that the settings for the user profiles and user authorities of users A and B are the same as those shown in FIG. 17.

Figure 5:
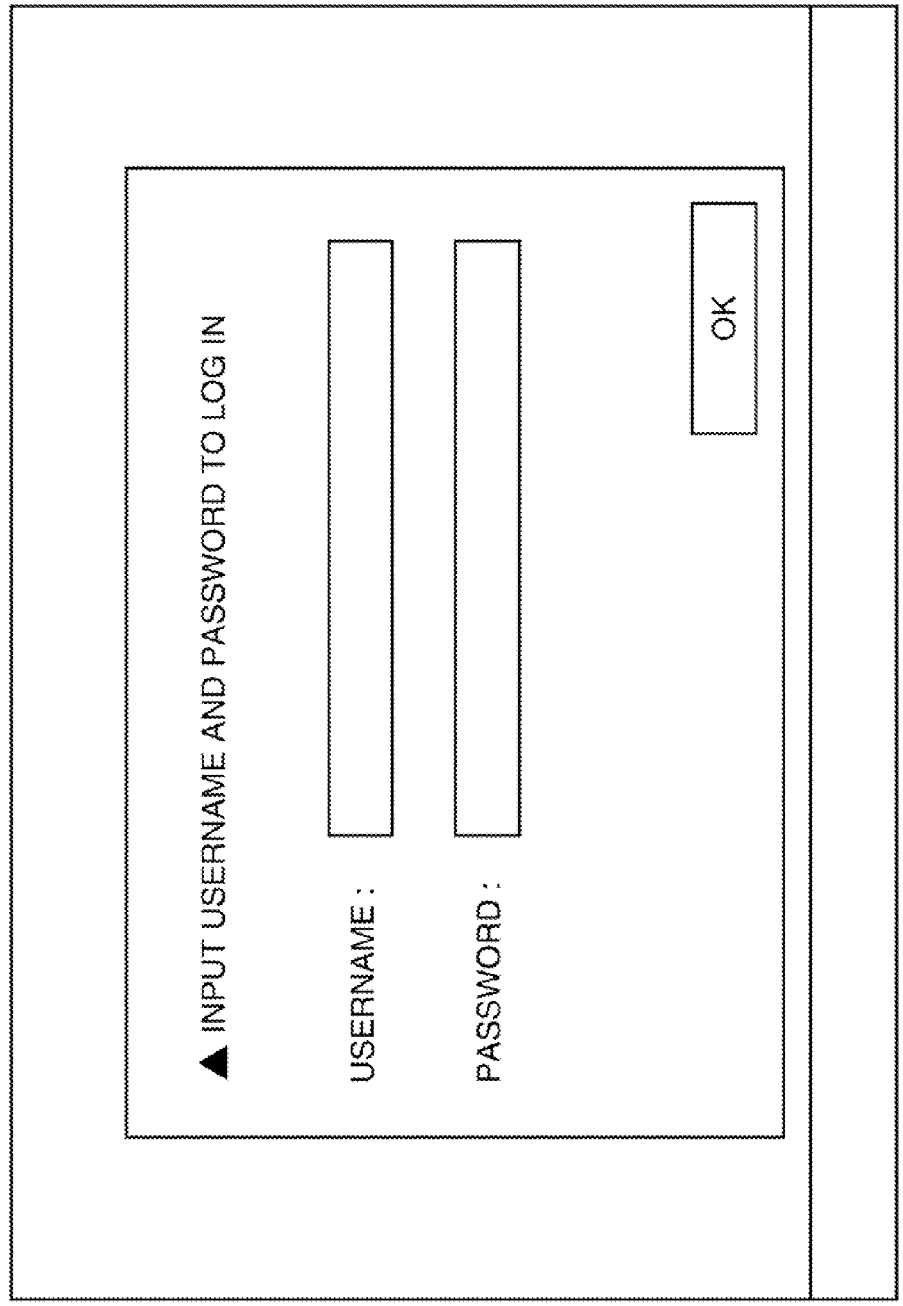
FIG. 5 is a diagram showing a login screen according to the first embodiment.

When a user logs in as the user A by selecting an OK button after inputting user information configured by a username, a password and the like on the login screen (FIG. 5), at time t701, a menu screen (FIG. 6) is displayed on the operation section 2012. A login user display area 9005 is arranged at the lower part of a main menu 9000 in FIG. 6, and it is displayed that a function is being executed by the user A at this time point. Since the user A is permitted to execute a color copying function in the setting information in FIG. 17, he can execute color copying when a color copying function 9001 in FIG. 6 is selected.

When the user selects "Return to menu" 9002 in FIG. 6 after execution of the color copying function ends, the screen returns to the main menu 9000. After that, when the user selects a network management function 9003 in FIG. 6 at time t702, the access management 3011 check the user authority of the user A to determines whether or not the user A is permitted to execute the network management function. Since the user A is prohibited to execute the network management function in the setting information in FIG. 17, the access management 3011 notifies the user session management 3010 to that effect. In response to this, the user session management 3010 displays a login screen 9050 (FIG. 7) requesting user authentication as a user permitted to execute the function.

Figure 7:
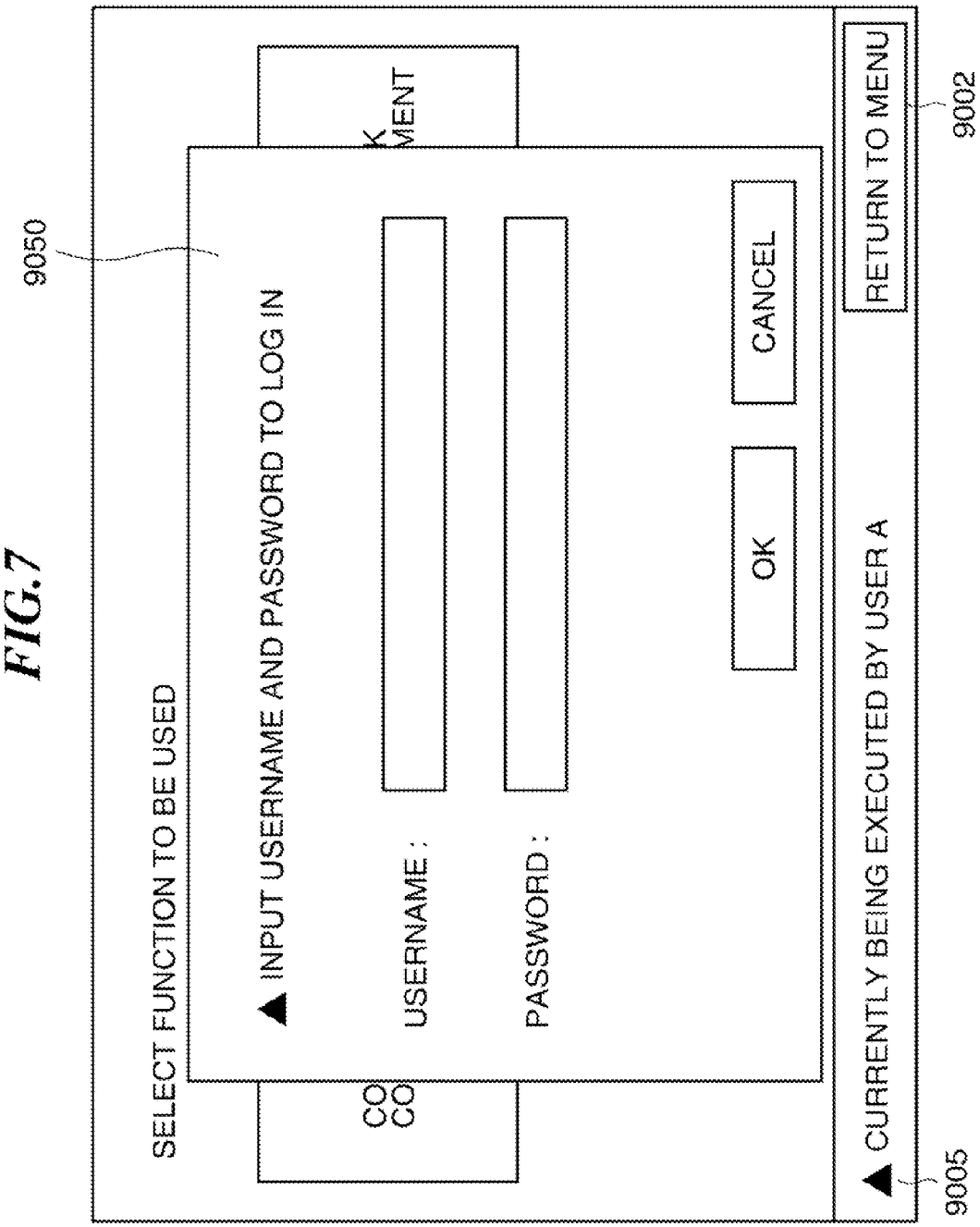
FIG. 7 is a diagram showing a login screen to be displayed when authority lacks, which is used in the first embodiment.

Here, when the user logs in again as the user B by inputting the authentication information about the user B on this login screen 9050 in FIG. 7, the user session management 3010 changes the user profile 7001 to that of the user B as indicated by reference numeral 7021 in FIG. 4, and the user authority 7002 to that of the user B as indicated by reference numeral 7022 in FIG. 4. However, information related to the user A continues to be held in the login user information 7003 without being discarded nor changed. At the same time, it is displayed in the login user display area 9005 that the network management function is being executed by the user B between the users A and B who have multiply logged in.

When the user selects "Return to menu" 9002 in FIG. 6 after execution of the network management function ends, the screen returns to the main menu 9000. After that, when the user selects the color copying function 9001 in FIG. 6 again at time t703, the access management 3011 checks the user authorities of the users A and B who have logged in to determine whether or not either one of the users are permitted to execute the color copying function. Since only the user A is permitted to execute color copying function in the setting information in FIG. 17, the access management 3011 notifies the user session management 3010 to that effect. In response to this, the user session management 3010 changes the user profile 7001 to that of the user A as indicated by reference numeral 7023 in FIG. 4 and the user authority 7002 to that of the user A as indicated by reference numeral 7024 in FIG. 4, on the basis of the information related to the user A which has been held in the login user information 7003. At the same time, it is displayed in the login user display area 9005 that the color copying function is being executed by the user A between the users A and B who have multiply logged in.

Figure 8:
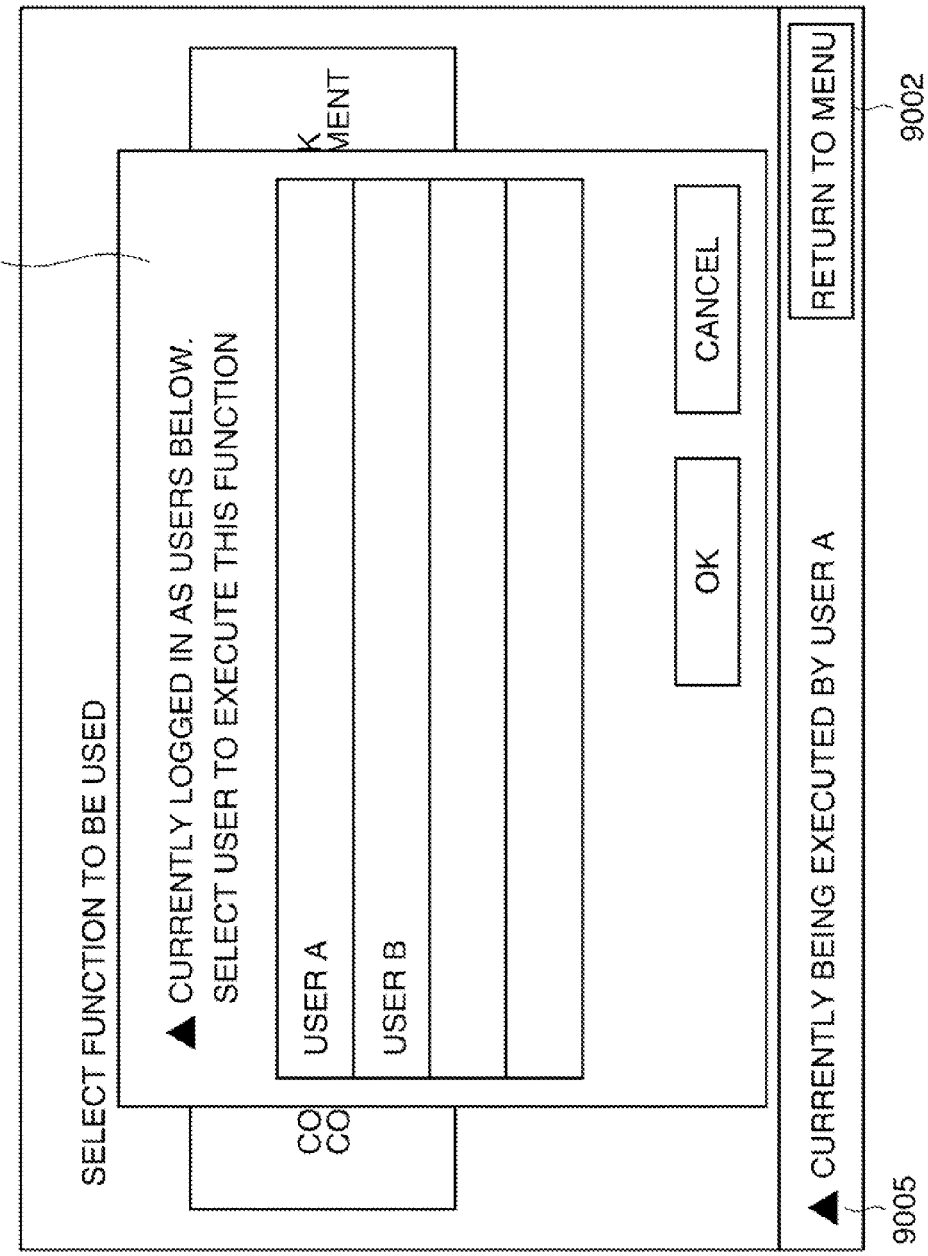
FIG. 8 is a diagram showing an execution user selection screen used in the first embodiment.

When the user selects "Return to menu" 9002 in FIG. 6 after execution of the color copying function ends, the screen returns to the main menu 9000. After that, when the user selects a fax function 9004 in FIG. 6 at time t704, the access management 3011 checks the user authorities of the users A and B who have logged in to determine whether or not either one of the users are permitted to execute the fax function. Since both users are permitted to execute the fax function in the setting information in FIG. 17, the access management 3011 notifies the user session management 3010 to that effect. In responses to this, the user session management 3010 displays an execution user selection screen 9060 in FIG. 8. Suppose that the user selects, for example, the user B as an execution user who is an executor to execute the fax function, on the execution user selection screen 9060. In this case, the user session management 3010 performs the processing as described below on the basis of information related to the user B which has been held in the login user information 7003. That is, the user profile 7001 is changed to that of the user B as indicated by reference numeral 7025 in FIG. 4, and the user authority 7002 is changed to that of the user B as indicated by reference numeral 7026 in FIG. 4 again. At the same time, it is displayed in the login user display area 9005 that the fax function is being executed by the user B, between the users A and B who have been multiply logged in.

On the other hand, if the user selects the user A as the fax function execution user on the execution user selection screen 9060, none of the contents of the user profile 7001, the contents of the user authority 7002, and the display in the login user display area 9005 is changed.

Characteristic Processing According to First Embodiment

Next, characteristic processing according to the first embodiment will be described with reference to FIG. 9.

Figure 9:
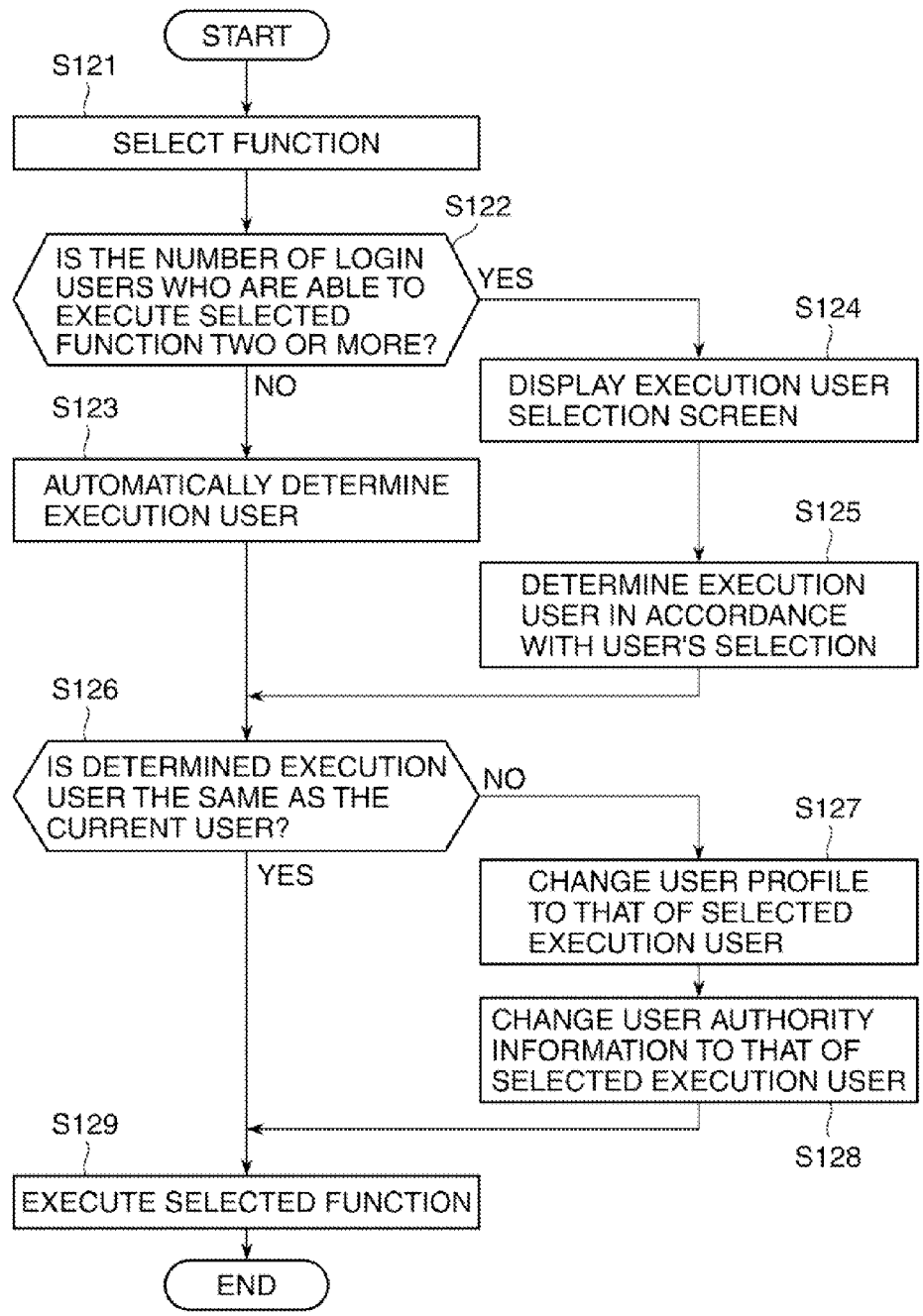
FIG. 9 is a flowchart showing a procedure for characteristic processing according to the first embodiment.

FIG. 9 is a flowchart showing a procedure for the characteristic processing according to the first embodiment. In this processing, execution user information is determined automatically or in accordance with user selection, when a function is selected, and this processing is executed by the CPU 2001 of the image processing apparatus 1004 as the function of the user session management 3010 and the access management 3011.

When a user selects a function in step S121, the access management 3011 determines whether or not the number of logged-in users permitted to execute the selected function is two or more, in the next step S122. If the number of such users is not two or more, the user session management 3010 automatically selects the only one user permitted to execute the selected function as an execution user, in step S123. Then, the process proceeds to the next step S126.

If the number of the logged-in users permitted to execute the selected function is two or more, the user session management 3010 displays the execution user selection screen 9060 (FIG. 8) in step S124. Then, in the next step S125, a user to execute the selected function is determined on the basis of the result of the selection made by the user on the execution user selection screen 9060. Then, the process proceeds to the next step S126.

In short, the processing of the flow from step S122 to step S126 via step S123 is the processing as described below. That is, when the number of users permitted to execute the selected function is only one, the user is automatically selected as a user to execute the selected function, without prompting reselection from a list of logged-in users, even if the number of the logged-in user is two or more.

Next, in step S126, the user session management 3010 determines whether or not the execution user determined by the above procedure is the same as the current execution user. If the execution user is the same, the process immediately proceeds to step S129, where the application 3012 executes the selected function. If the execution user is not the same, the user session management 3010 changes the user profile to that of the determined execution user in step S127, and further changes the user authority to that of the determined execution user in step S128. Then, in step S129, the selected function is executed.

Advantages of First Embodiment

According to this embodiment, it is possible to reduce the frequency of a user's inputting work for authentication information to improve the convenience, in an apparatus configured to be capable of restricting access to jobs and resources depending on a user who logs in.

Furthermore, the login user display area 9005 is provided so that it is displayed which of logged-in users a predetermined function is executed by. Thereby, it is possible for the user to easily determine which user's user profile, among those of the logged-in users, an operation for executing a function is performed on the basis of.

Second Embodiment

Next, a second embodiment of the present invention will be described.

The basic configuration of the second embodiment is similar to that described with reference to FIGS. 1 to 3 in the above first embodiment. A characteristic part of the second embodiment will be described below.

User Session Management of Second Embodiment

Figure 10:
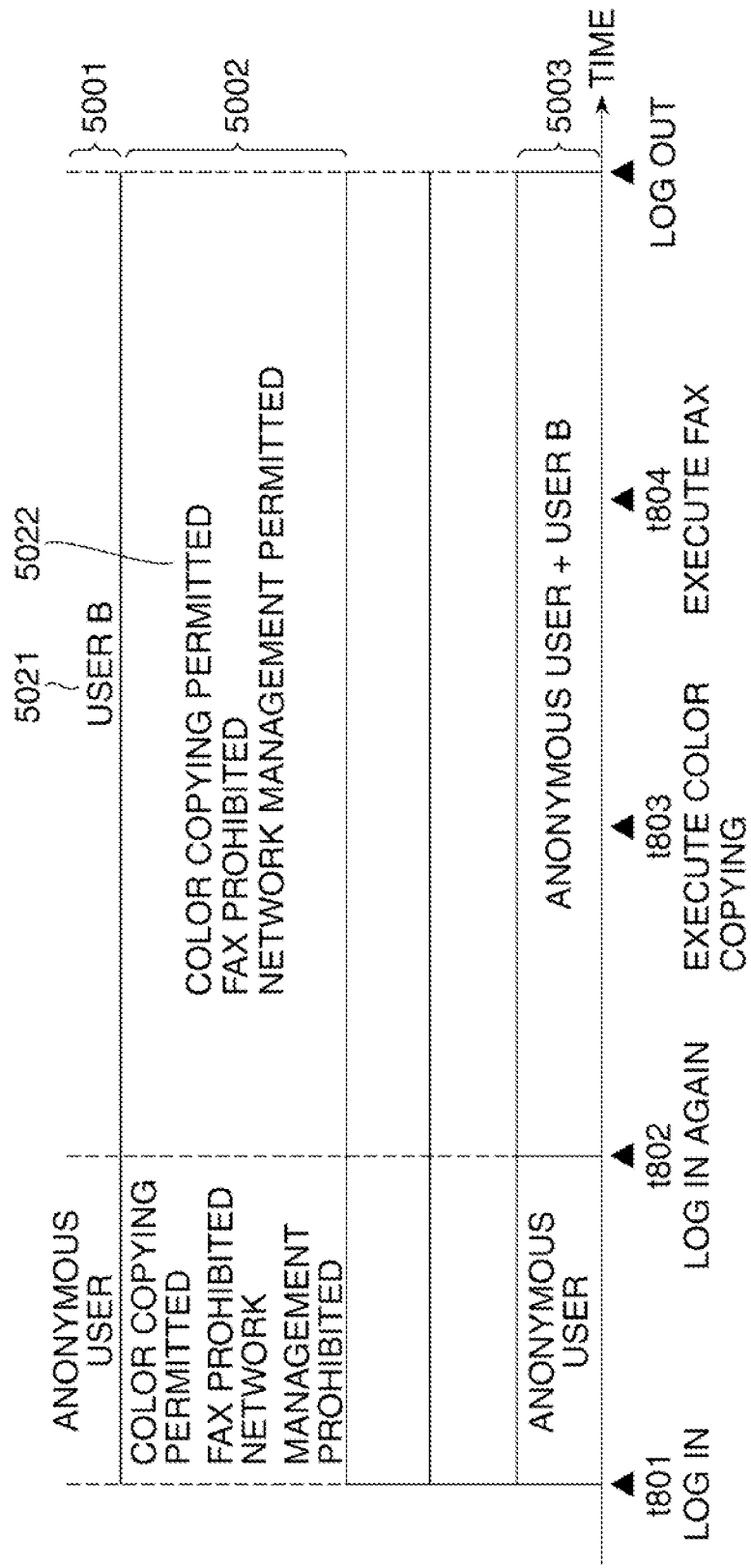
FIG. 10 is a timing chart showing user session management according to a second embodiment of the present invention.

FIG. 10 is a timing chart showing user session management according to the second embodiment of the present invention.

The user session management of this embodiment is executed by the CPU 2001 of the image processing apparatus 1004 as the function of the user session management 3010 and the access management 3011. Reference numerals 5001 to 5003 in FIG. 10 indicate the same as indicated by reference numerals 4001 to 4003 in FIG. 16.

FIG. 11 is a tabular form diagram showing settings for the user profiles and user authorities of users A and B used in FIG. 10.

In the example shown in FIG. 11, user type information 8001 indicting the type (classification) of user is registered as a user profile, as is distinct from the example in FIG. 17 used in the first embodiment. The user types include, for example, an anonymous user and a real-name user. The anonymous user is a special user used by an unspecified large number of persons. The anonymous user does not have user identification elements, such as username information about the name of the user and a mail address. The real-name user is a user who has such user identification elements.

When a user logs in as an anonymous user by selecting the OK button without inputting user information on the login screen (FIG. 5) at time t801, a menu screen (FIG. 12) is displayed on the operation section 2012. A login user display area 9015 is arranged at the lower part of a main menu 9010, and it is displayed that a function is being executed by the anonymous user at this time point. Since the anonymous user is permitted to execute the color copying function in setting information in FIG. 11, he can execute a color copying function 9011. It should be noted that login as the anonymous user may be automatically performed when the image processing apparatus 1004 is activated.

Figure 12:
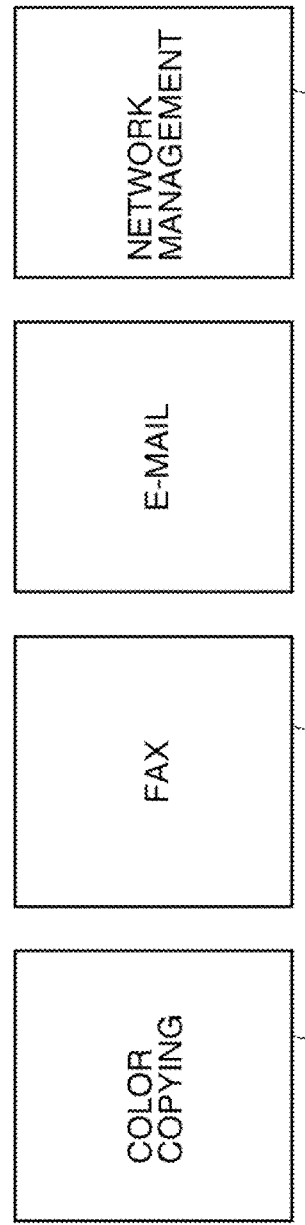
FIG. 12 is a diagram showing a menu screen used in the second embodiment.
Figure 13:
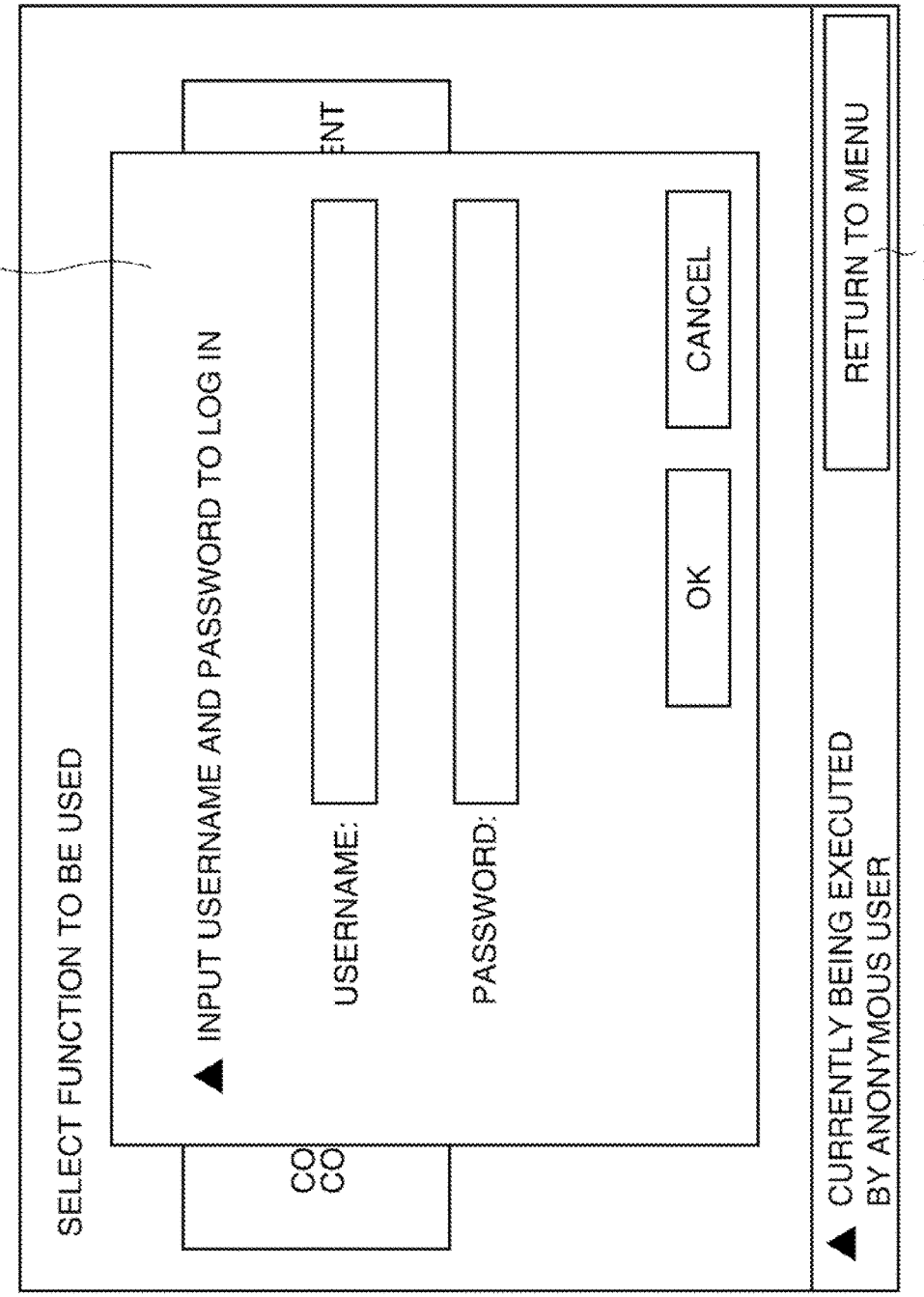
FIG. 13 is a diagram showing a login screen to be displayed when authority lacks, which is used in the second embodiment.

When the user selects "Return to menu" 9012 in FIG. 12 after execution of the color copying function ends, the screen returns to the main menu 9010. After that, when the user selects a network management function 9013 in FIG. 12 at time t802, the access management 3011 checks the user authority of the anonymous user to determine whether or not the anonymous user is permitted to execute network management function. Since the anonymous user is prohibited to execute the network management function in the setting information in FIG. 11, the access management 3011 notifies the user session management 3010 to that effect. In response to this, the user session management 3010 displays a login screen 9070 (FIG. 13) requesting authentication of an authorized user. Here, when the user logs in again as the user B by inputting the authentication information about the user B on the login screen 9070, the user session management 3010 changes the user profile 5001 to that of the user B as indicated by reference numeral 5021 in FIG. 10, and changes the user authority 5002 so that all of the items, each of which has been permitted to either of the anonymous user and the user B, are changed to be "permitted" as indicated by reference numeral 5022 in FIG. 10. At the same time, it is displayed in the login user display area 9015 that the function is being executed by the user B.

When the user selects "Return to menu" 9012 in FIG. 12 after execution of the network management function ends, the screen returns to the main menu 9010. After that, when the user selects the color copy function 9011 in FIG. 12 at time t803 again, the access management 3011 checks the user authorities of the the currently logged-in users regarding to determine whether or not either of the users are permitted to execute the color copying function. Since the currently logged-in user is permitted to execute color copying in the user authority indicated by reference numeral 5022 in FIG. 10, he can execute the color copying function without the need for displaying the login screen 9070 again. Furthermore, it is displayed in the login user display area 9015 that the function is being executed by the user B, without any change being made in the login user display area 9015.

Figure 14:
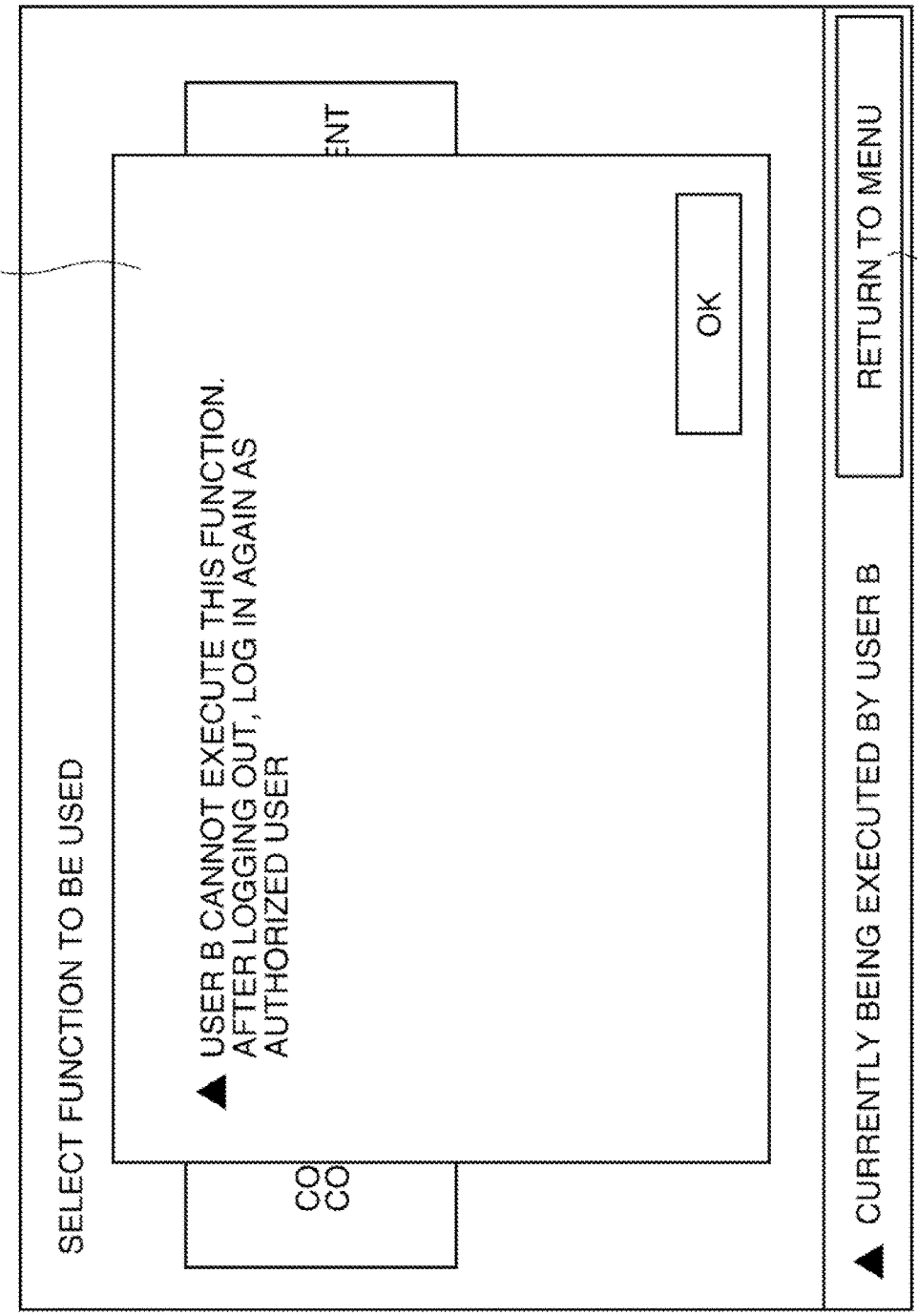
FIG. 14 is a diagram showing an error screen used in the second embodiment.

When the user selects "Return to menu" 9012 in FIG. 12 after re-execution of the color copying function ends, the screen returns to the main menu 9010. After that, when the user selects the fax function 9014 at time t803, the access management 3011 checks the user authorities of the currently logged-in users to determine whether or not either of the users are permitted to execute the fax function. Since the currently logged-in user is not permitted to execute the fax function in the user authority indicated by reference numeral 5022 in FIG. 10, it is notified to the user session management 3010. In responses to this, the user session management 3010 displays an error screen 9080 (FIG. 14) notifying that it is not possible to change the user. This is because, in the second embodiment, further authentication is prohibited when login as the real-name user has been performed. The user profile 5001 and the user authority 5002 are never changed.

It should noted that: in the case of logging in as the user A, who is a real-name user, when inputting user information on the login screen (FIG. 5), and attempting to execute the network management function 9013, the error screen 9080 (FIG. 14) notifying that it is impossible to change the user is displayed similarly.

Characteristic Processing According to Second Embodiment

Next, characteristic processing according to the second embodiment will be described with reference to FIG. 15.

Figure 15:
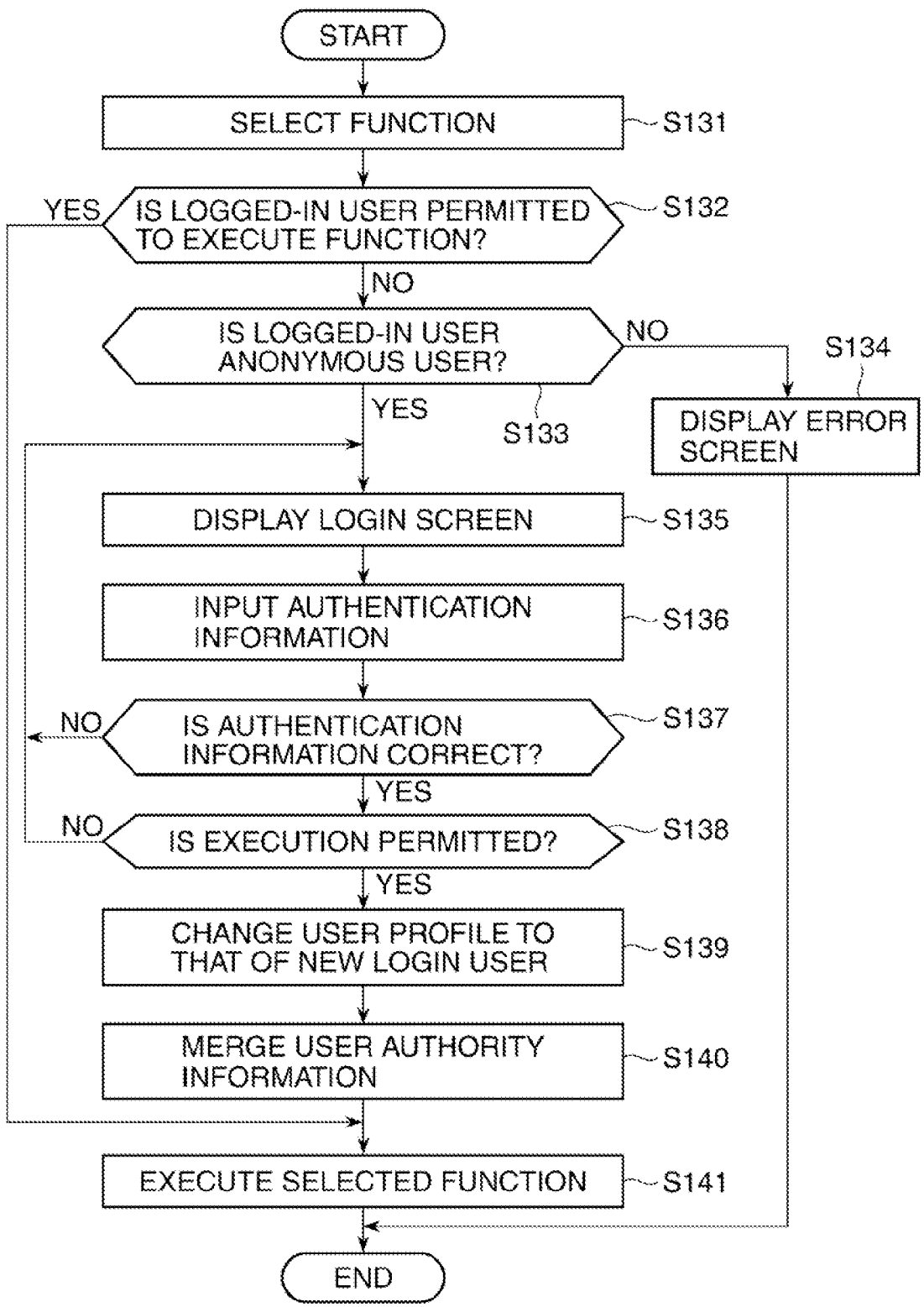
FIG. 15 is a flowchart showing a procedure for processing according to the second embodiment.

FIG. 15 is a flowchart showing a procedure for the processing according to the second embodiment. This processing is processing for determining whether or not to cause authentication to be performed again depending on the user type of a logged-in user when authority lacks, and it is executed by the CPU 2001 of the image processing apparatus 1004 as the function of the user session management 3010 and the access management 3011.

When a user selects a function in step S131, the access management 3011 determines whether or not the logged-in user is permitted to execute the selected function, in step S132. If it is determined that the user is permitted to execute the selected function, the process proceeds to step S141, where the application 3012 executes the selected function. On the other hand, if it is determined that the user is not permitted to execute the selected function, the user session management 3010 determines whether or not the logged-in user is an anonymous user, in step S133. If it is determined that the user is not an anonymous user, the process proceeds to step S134, where the error screen 9080 (FIG. 14) is displayed.

On the other hand, if it is determined that the logged-in user is an anonymous user, the process proceeds to step S135, where the login screen 9070 (FIG. 13) is displayed. In step S136, input of authentication information is received from the user. It is determined in step S137 whether or not the received authentication information is correct. If it is not correct, the process returns to the processing of step S135. On the other hand, if the received authentication information is correct, the access management 3011 determines whether or not a newly logged-in real-name user is permitted to execute the selected function on the basis of the received authentication information in step S138. If the real-name user is not permitted to execute the selected function, the process returns to step S135.

On the other hand, if the real-name user is permitted to execute the selected function, the user session management 3010 overwrites the user profile with that of the newly logged-in user, in step S139. Then, the user authority information is merged in step S140, and the selected function is executed in step S141.

Advantages According to Second Embodiment

Even when an anonymous user and a real-name user are synthesized as a logged-in user, advantages equal to those of the first embodiment can be obtained.

It is to be understood that the present invention may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2008-283306 Nov. 4, 2008, which is hereby incorporated by reference herein in its entirety.

What is claimed is:

1. An information processing apparatus comprising:
a memory device that stores a set of instructions; and
at least one processor that executes instructions in the memory device to:
execute, in accordance with an activation of the information processing apparatus, a first login process of an unspecified user into the information processing apparatus,
display a menu screen for selecting one of a plurality of applications, in a state in which the first login process is executed,
accept, in a state in which a logged in user is the unspecified user, a selection of one of the plurality of applications,
execute, in a state in which a logged in user is the unspecified user, an application selected by a user using the menu screen, in a state in which the unspecified user is allowed to use the selected application,
display, in a state in which a logged in user is the unspecified user, a login screen, in a state in which the unspecified user is not allowed to use the selected application,
execute, in a state in which a logged in user is the unspecified user, a second login process of a specified user into the information processing apparatus, and
execute the selected application that the unspecified user is not allowed to use, in a state in which the specified user has an authority to use the selected application and a logged in user is the specified user,
wherein, in a state in which the specified user does not have the authority to use the selected application and a logged in user is the specified user, the logged in user is not allowed to use the selected application, wherein the information processing apparatus allows the specified user to log into the information processing apparatus in a state in which the unspecified user has logged into the information processing apparatus, and wherein the information processing apparatus does not allow a first specified user to log into the information processing apparatus in a state in which a second specified user has already logged into the information processing apparatus.

2. The information processing apparatus according to claim 1, wherein, the information processing apparatus does not allow the second specified user to log into the information processing apparatus in a state in which the first specified user has already logged into the information processing apparatus.

3. The information processing apparatus according to claim 1, wherein, the at least one processor executes instructions in the memory device to:

determine whether a logged in user is the unspecified user or the specified user, allow the specified user to input authentication information, in a state in which it is determined that the logged in user is the unspecified user, and restrict another specified user to input the authentication information, in a state in which it is determined that the logged in user is the specified user.

4. The information processing apparatus according to claim 1, wherein, the at least one processor executes instructions in the memory device to:

change at least a user profile and a user authority for the information processing apparatus in accordance with an input of user authentication information, the user profile including a user name, a mail address, or both a user name and a mail address of at least the first specified user or the second specified user, respectively.

5. The information processing apparatus according to claim 1, wherein, the at least one processor executes instructions in the memory device to:

specify a particular user by using authentication information input by the particular user.

6. The information processing apparatus according to claim 1, wherein, the at least one processor executes instructions in the memory device to:

execute the first login process without an input of authentication information for specifying a user.

7. The information processing apparatus according to claim 1, wherein, the unspecified user does not have user identification including username information about a name of the unspecified user, a mail address, or both the name of the unspecified user and the mail address.

8. A control method for an information processing apparatus including a plurality of functions, the method comprising:

executing, in accordance with an activation of the information processing apparatus, a first login process of an unspecified user into the information processing apparatus, displaying a menu screen for selecting one of a plurality of applications, in a state in which the first login process is executed, accepting, in a state in which a logged in user is the unspecified user, a selection of one of the plurality of applications, executing, in a state in which a logged in user is the unspecified user, an application selected by a user using the menu screen, in a state in which the unspecified user is allowed to use the selected application, displaying, in a state in which a logged in user is the unspecified user, a login screen, in a state in which the unspecified user is not allowed to use the selected application, executing, in a state in which a logged in user is the unspecified user, a second login process of a specified user into the information processing apparatus, and executing the selected application that the unspecified user is not allowed to use, in a state in which the specified user has an authority to use the selected application and a logged in user is the specified user, wherein, in a state in which the specified user does not have the authority to use the selected application and a logged in user is the specified user, the logged in user is not allowed to use the selected application, wherein the information processing apparatus allows the specified user to log into the information processing apparatus in a state in which the unspecified user has logged into the information processing apparatus, and wherein the information processing apparatus does not allow a first specified user to log into the information processing apparatus in a state in which a second specified user has already logged into the information processing apparatus.

9. A non-transitory computer-readable storage medium storing a computer-readable program for implementing a control method for an information processing apparatus including a plurality of functions, the method comprising:

executing, in accordance with an activation of the information processing apparatus, a first login process of an unspecified user into the information processing apparatus, displaying a menu screen for selecting one of a plurality of applications, in a state in which the first login process is executed, accepting, in a state in which a logged in user is the unspecified user, a selection of one of the plurality of applications, executing, in a state in which a logged in user is the unspecified user, an application selected by a user using the menu screen, in a state in which the unspecified user is allowed to use the selected application, displaying, in a state in which a logged in user is the unspecified user, a login screen, in a state in which the unspecified user is not allowed to use the selected application, executing, in a state in which a logged in user is the unspecified user, a second login process of a specified user into the information processing apparatus, and executing the selected application that the unspecified user is not allowed to use, in a state in which the specified user has an authority to use the selected application and a logged in user is the specified user, wherein, in a state in which the specified user does not have the authority to use the selected application and a logged in user is the specified user, the logged in user is not allowed to use the selected application, wherein the information processing apparatus allows the specified user to log into the information processing apparatus in a state in which the unspecified user has logged into the information processing apparatus, and wherein the information processing apparatus does not allow a first specified user to log into the information processing apparatus in a state in which a second specified user has already logged into the information processing apparatus.

10. An information processing apparatus comprising:
a memory device that stores a set of instructions; and
at least one processor that executes instructions in the memory device to:

execute an activation of the information processing apparatus, wherein the information processing apparatus is activated in a state in which an unspecified user is logged into the information processing apparatus, display a menu screen for selecting one of a plurality of applications, in a state in which the unspecified user is logged into the information processing apparatus, accept, in a state in which a logged in user is the unspecified user, a selection of one of the plurality of applications, execute, in a state in which that a logged in user is the unspecified user, an application selected by a user using the menu screen, in a state in which the unspecified user is allowed to use the selected application, display, in a state in which a logged in user is the unspecified user, a screen for inputting a user credential, in a state in which the unspecified user is not allowed to use the selected application, execute, in a state in which a logged in user is the unspecified user, an authentication process of a specified user based on the user credential inputted via the screen, and execute the selected application that the unspecified user is not allowed to use, in a state in which authentication of the specified user succeeded, the specified user has an authority to use the selected application, and the specified user is logged into the information processing apparatus, wherein, in a state in which authentication of the specified user succeeded, the specified user does not have the authority to use the selected application, and the specified user is logged into the information processing apparatus, the logged in user is not allowed to use the selected application, wherein the information processing apparatus does not allow a first specified user to log into the information processing apparatus in a state in which a second specified user has already logged into the information processing apparatus.

11. The information processing apparatus according to claim 10, wherein,
the information processing apparatus does not allow the second specified user to log into the information processing apparatus in a state in which the first specified user has already logged into the information processing apparatus.

12. The information processing apparatus according to claim 10, wherein,
the at least one processor executes instructions in the memory device to:
determine whether a logged in user is the unspecified user or the specified user,
allow the specified user to input authentication information, in a state in which it is determined that the logged in user is the unspecified user, and
restrict another specified user to input the authentication information, in a state in which it is determined that the logged in user is the specified user.

13. The information processing apparatus according to claim 10, wherein,
the at least one processor executes instructions in the memory device to:
change at least a user profile and a user authority for the information processing apparatus in accordance with an input of user authentication information, the user profile including a user name, a mail address, or both a user name and a mail address of at least the first specified user or the second specified user, respectively.

14. The information processing apparatus according to claim 10, wherein,
the at least one processor executes instructions in the memory device to:
specify a particular user by using authentication information input by the particular user.

15. The information processing apparatus according to claim 10, wherein
the information processing apparatus is activated in a state in which an unspecified user is logged into the information processing apparatus without an input of authentication information for specifying a user.

16. The information processing apparatus according to claim 10, wherein,
the unspecified user does not have user identification including username information about a name of the unspecified user, a mail address, or both the name of the unspecified user and the mail address.

17. A control method for an information processing apparatus including a plurality of functions, the method comprising:

executing an activation of the information processing apparatus, wherein the information processing apparatus is activated in a state in which an unspecified user is logged into the information processing apparatus, displaying a menu screen for selecting one of a plurality of applications, in a state in which the unspecified user is logged into the information processing apparatus, accepting, in a state in which a logged in user is the unspecified user, a selection of one of the plurality of applications, executing, in a state in which a logged in user is the unspecified user, an application selected by a user using the menu screen, in a state in which the unspecified user is allowed to use the selected application, displaying, in a state in which a logged in user is the unspecified user, a screen for inputting a user credential, in a state in which the unspecified user is not allowed to use the selected application, executing, in a state in which a logged in user is the unspecified user, authentication process of a specified user based on the user credential inputted via the screen, and executing the selected application that the unspecified user is not allowed to use, in a state in which authentication of the specified user succeeded, the specified user has an authority to use the selected application, and the specified user is logged into the information processing apparatus, wherein, in a state in which authentication of the specified user succeeded, the specified user does not have the authority to use the selected application, and the specified user is logged into the information processing apparatus, the logged in user is not allowed to use the selected application, wherein the information processing apparatus does not allow a first specified user to log into the information processing apparatus in a state in which a second specified user has already logged into the information processing apparatus.

18. A non-transitory computer-readable storage medium storing a computer-readable program for implementing a control method for an information processing apparatus including a plurality of functions, the method comprising:

executing an activation of the information processing apparatus, wherein the information processing apparatus is activated in a state in which an unspecified user is logged into the information processing apparatus, displaying a menu screen for selecting one of a plurality of applications, in a state in which the unspecified user is logged into the information processing apparatus, accepting, in a state in which a logged in user is the unspecified user, a selection of one of the plurality of applications, executing, in a state in which a logged in user is the unspecified user, an application selected by a user using the menu screen, in a state in which the unspecified user is allowed to use the selected application, displaying, in a state in which a logged in user is the unspecified user, a screen for inputting a user credential, in a state in which the unspecified user is not allowed to use the selected application, executing, in a state in which a logged in user is the unspecified user, authentication process of a specified user based on the user credential inputted via the screen, and executing the selected application that the unspecified user is not allowed to use, in a state in which authentication of the specified user succeeded, the specified user has an authority to use the selected application, and the specified user is logged into the information processing apparatus, wherein, in a state in which authentication of the specified user succeeded, the specified user does not have the authority to use the selected application, and the specified user is logged into the information processing apparatus, the logged in user is not allowed to use the selected application, wherein the information processing apparatus does not allow a first specified user to log into the information processing apparatus in a state in which a second specified user has already logged into the information processing apparatus.

\* \* \* \* \*